United States Patent
Kuo

(10) Patent No.: US 8,096,673 B2
(45) Date of Patent: Jan. 17, 2012

(54) AUTO-CONTROLLING POWER SAVING SYSTEM FOR SOLAR ENERGY STREET LAMPS

(76) Inventor: Chien-Chih Kuo, Taipei (TW)

( * ) Notice: Subject to any disclaimer, the term of this patent is extended or adjusted under 35 U.S.C. 154(b) by 628 days.

(21) Appl. No.: 12/256,460

(22) Filed: Oct. 22, 2008

(65) Prior Publication Data

US 2010/0097001 A1   Apr. 22, 2010

(51) Int. Cl.
*F21L 4/00* (2006.01)
(52) U.S. Cl. .......................... 362/183; 362/184; 320/101
(58) Field of Classification Search ................ 362/183, 362/184, 185; 320/101; 323/906
See application file for complete search history.

(56) References Cited

U.S. PATENT DOCUMENTS

| | | | | |
|---|---|---|---|---|
| 5,149,188 | A | * | 9/1992 | Robbins ........................ 362/183 |
| 6,784,357 | B1 | * | 8/2004 | Wang ............................ 136/244 |
| 2007/0235071 | A1 | * | 10/2007 | Work et al. .................. 136/244 |
| 2008/0143295 | A1 | * | 6/2008 | Wang ............................ 320/123 |

* cited by examiner

*Primary Examiner* — Thuy Vinh Tran

(57) ABSTRACT

An auto-controlling power saving system for solar energy street lamps includes at least one street lamp, each street lamp having a light source at an upper end thereof; a battery set; at least one solar plate installed at an upper end of the light source for absorbing solar energy; the absorbed solar energy being converted into electric power which is transferred to the light source for lighting up the light source or is stored in the battery set; a main controller for controlling all electric powers of the elements of the system for power management; the main controller controlling actuation, de-actuation and illumination of all street lamps; the main controller being connected to the battery sets of the street lamps and the related elements used; the main controller having a plurality of power control modes for power management and illumination control of the street lamps.

13 Claims, 6 Drawing Sheets

AUTO-CONTROLLING POWER SAVING SYSTEM FOR SOLAR ENERGY STREET LAMPS

FIELD OF THE INVENTION

The present invention relates to solar energy power saving, in particular to an auto-controlling power saving system for solar energy street lamps, wherein the power storage of the battery sets are measured and the measured data is transferred to a main controller. The main controller includes four power control modes for adjusting illuminations of a plurality of street lamps so as to prolong the lifetimes of the battery sets of the street lamps and thus the lifetime of the street lamps are also prolonged.

BACKGROUND OF THE INVENTION

Due to the shortage of energy and the greenhouse effect of the earth, more and more lamp sources use solar energy as power source. This is because solar energy is a clean energy and can be got easily.

The prior art solar lamp has a battery set installed at a lower side of the lamp rod. It is heavy and is easily theft. Furthermore, each battery set serves for only one light source. In cloudy day, the sunlight is insufficient. The power storage in the battery set is also insufficient. It cannot provide sufficient illumination to the light source. As a result, some light sources can not light up or light up only a short time.

There are some patents related to the power control of the solar lamp, for example, in U.S. Pat. No. 6,909,245, "Ballast circuit for control of lamp power" in that a ballast circuit for operating a discharge lamp is equipped with a control loop for controlling the power consumed by the lamp. A first circuit part is coupled to the discharge lamp and to input terminals for connection to a source of supply voltage for the ballast circuit. The first circuit part is coupled to the input terminals to supply lamp current from the supply voltage. The control loop includes a second circuit part coupled to the first circuit to generate a first signal that represents a desired value of lamp power. A third circuit part is coupled to the input terminals for generating a second signal that depends on the amplitude of the supply voltage. A fourth circuit part has an input coupled to the third circuit part and an output coupled to an input of the second circuit part for adjusting the value of the first signal dependent upon the second signal. The power consumed by the lamp is decreased when the amplitude of the supply voltage decreases. Too high currents in the ballast circuit are thereby prevented.

Furthermore, in U.S. Pat. No. 6,031,211, "Radiation-sensitive control circuit for driving lamp at various power levels", an exposure system is disclosed, which comprises a lamp, a power supply for directing said lamp at an idle level which optimizes the life of said lamp, means for driving light from said lamp through a light path to an exposure plane, exposure means for controlling the exposure period during which light at a preselected level from said lamp reaches the exposure plane, light detector means in the light path coordinated with said exposure means for detecting the light intensity from said lamp during the exposure period, and a control circuit connected to said power supply, said control circuit being responsive to said light detector for adjusting said power supply to provide the preselected level of light output from said lamp during the exposure period, said control circuit including means for reducing the power to said lamp below the idle level, means for increasing the power to said lamp above the idle level, and a summing circuit connected to said light detector for producing an output to cause a reduction or an increase in the power to said lamp.

However, these prior art are only related to power control for only one lamp. No prior art provides a system for controlling the power of many lamps, this is especially important for street lamps. Generally, a load has many street lamps, especially in a large load, such as a super high way which is arranged several hundreds or thousands lamps. However the prior art power control of the lamp is individual, that is the power control can not be performed by adjusting the power levels of several light sources.

Furthermore, it is known that if power stored in the battery set is full or exhausts completely through a longer time, the performance of the street lamp will deteriorate and thus the lifetime of the street lamp is shortened.

SUMMARY OF THE INVENTION

Accordingly, the object of the present invention is to provide an auto-controlling power saving system for solar energy street lamps, where the power storage of the battery sets are measured and the measured result is transferred to a main controller. The main controller includes four power control modes for adjusting illuminations of a plurality of street lamps so as to prolong the lifetimes of the battery sets of the street lamps and thus the lifetime of the street lamps are also prolonged.

To achieve above object, the present invention provides a An auto-controlling power saving system for solar energy street lamps, comprising: at least one street lamp, each street lamp having a light source at an upper end thereof; a battery set; at least one solar plate installed at an upper end of the light source for absorbing solar energy; the absorbed solar energy being converted into electric power which is transferred to the light source for lighting up the light source or is stored in the battery set; and a main controller for controlling all electric powers of the elements of the system for power management; the main controller controlling actuation, de-actuation and illumination of all street lamps; the main controller being connected to the battery sets of the street lamps and the related elements used; the main controller having a plurality of power control modes for power management and illumination control of the street lamps.

In the present invention, the main controller provides four control modes for controlling the powers of the system of the present invention. In first mode, when the number of the street lamps is greater than two, the main controller calculates power of all the battery sets for all the street lamps so as to determine the illuminations of all street lamps; if the powers of all battery sets are not sufficient to light up all the light sources, the main controller sets that only some of the light sources light up, while other light sources are not actuated. In the second mode, The main controller sets that only some selected light sources light up with a predetermined illumination, namely, not fully light up. In the third mode, voltage level of a DC-AC ballast connected to the light source is controlled so as to adjust the illumination of the light source. Moreover, in fourth mode, the main controller controls a light up time period of each light source based on power status of the battery sets.

Furthermore, the battery set is arranged at a middle section of the lamp rod and has a plurality of cells, the cells are arranged serially along the longitudinal direction of the lamp rod. Each of an input end and an output end of each battery set has a relay for controlling power flow from the solar plate.

Each light source is a HGD light source or a HID light source. Each light source further comprises: a DC-AC ballast 6 is installed between the battery set 4 and the light source for actuating the light source and providing stable power supply so that the light source has stable power for lighting up.

Further, the light source is an LED lamp, and an input end of the LED lamp is connected with a DC to DC converter for converting DC current from the solar plate or the battery set into DC current with lower voltage. The auto-controlling power saving system further comprises a recording unit connected to the main controller for providing recording data to the main controller. The recording unit has a history database which stores related history data by which the system manager could understand the system and the history data also assists to the control of the system. The recording unit has a control rule database storing all rules for the main controller by that the main controller can control the system based on the rule in the control rule database. The recording unit has a controller output database storing output data of the main controller.

The various objects and advantages of the present invention will be more readily understood from the following detailed description when read in conjunction with the appended drawing.

BRIEF DESCRIPTION OF THE DRAWINGS

FIG. 7 shows an experiment result about the variations of voltages with the power storage of a battery, in that the operation mode of the present invention is used.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
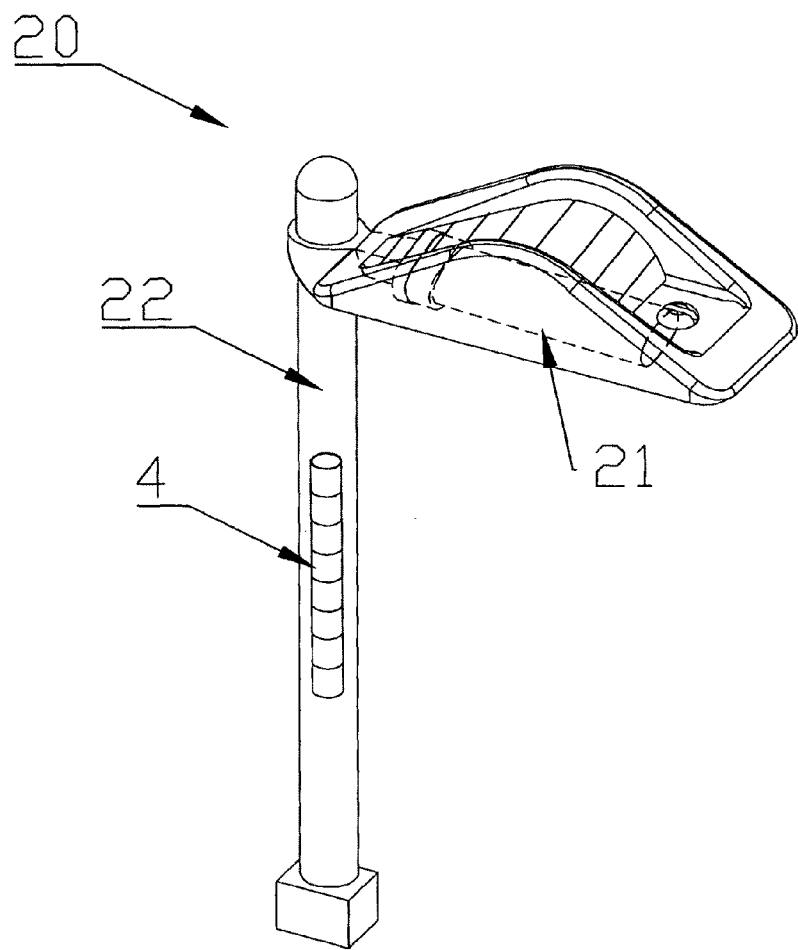
FIG. 1 shows the solar energy street lamp of the present invention.
Figure 2:
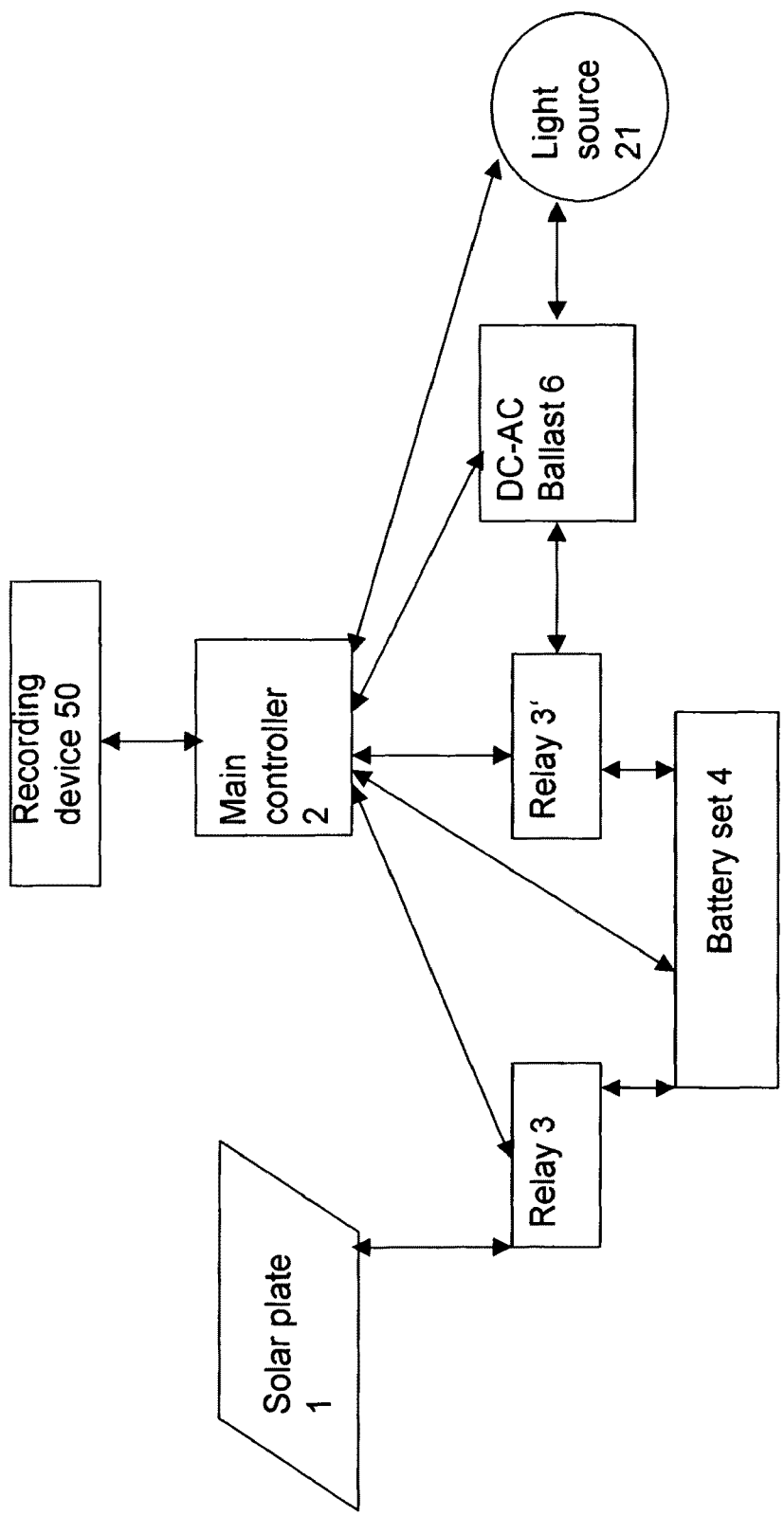
FIG. 2 is a structural block diagram of the auto-controlling power saving system for solar energy street lamps according to the present invention.
Figure 3:
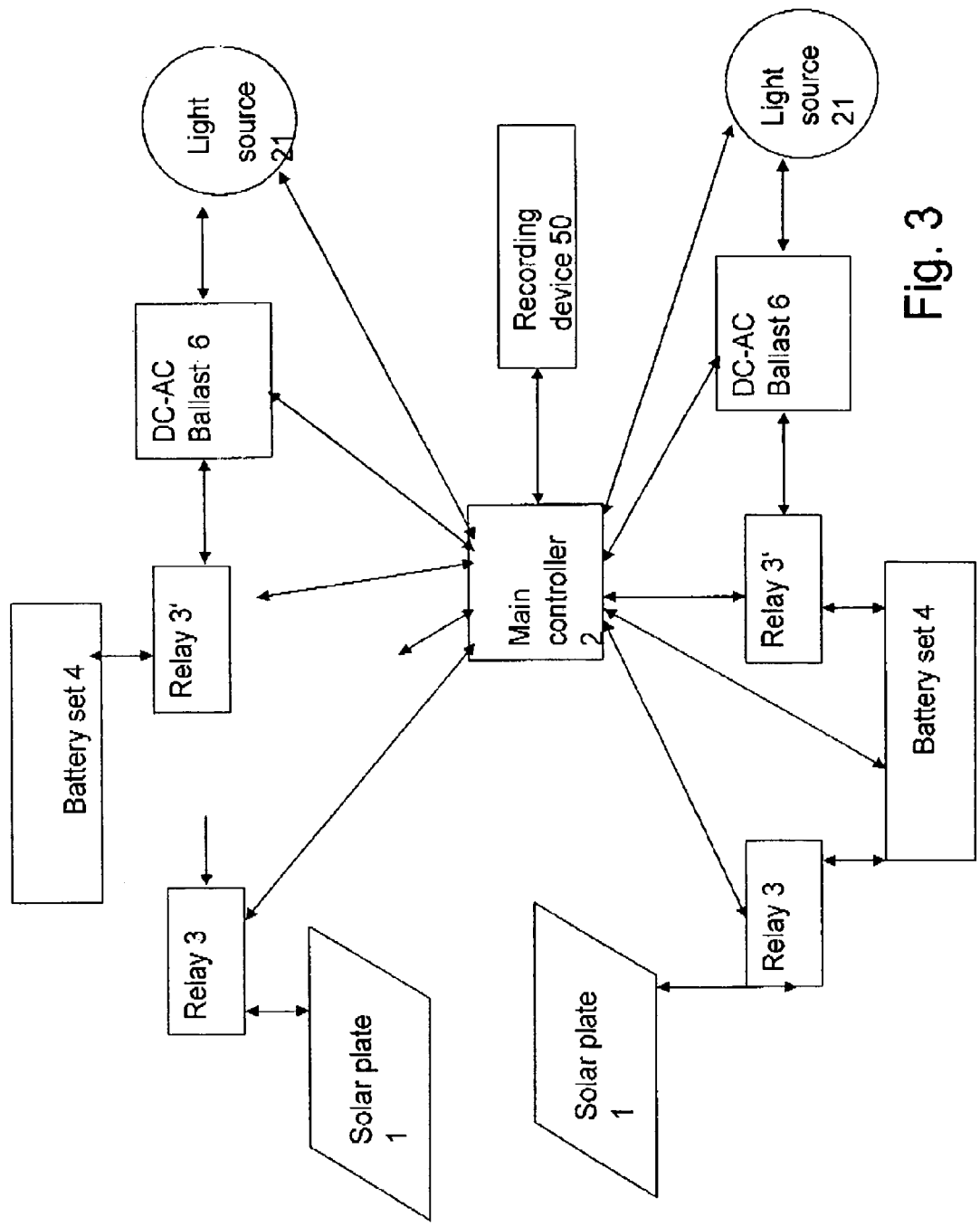
FIG. 3 shows the structural block diagram of the present invention for the embodiment that two street lamps are used in the present invention.

In the following, a preferred embodiment about the structure and components of the present invention will be described. The effect and advantages of the present invention will also be described so that the reader can understand the present invention easily. Referring to FIGS. 1, 2 and 3, in FIG. 1, the solar energy street lamp module according to the present invention is illustrated. In FIG. 2, a block diagram for an automatic power saving system for solar energy lamps is illustrated. FIG. 3 shows the structural block diagram of the present invention which serves for the case that a plurality of street lamps are used.

The auto-controlling power saving system for solar energy street lamps according to the present invention includes the following elements.

A main controller 2 serves for controlling all electric powers for the elements of the present invention so as to achieve the object of power management. The main controller 2 controls the actuation, de-actuation and illumination of all street lamps of the present invention. The main controller 2 is connected to the battery sets 4 of the street lamps and the related elements used in the present invention. The main controller 2 has a plurality of power control modes for power management and illumination control of the street lamps.

Figure 5:
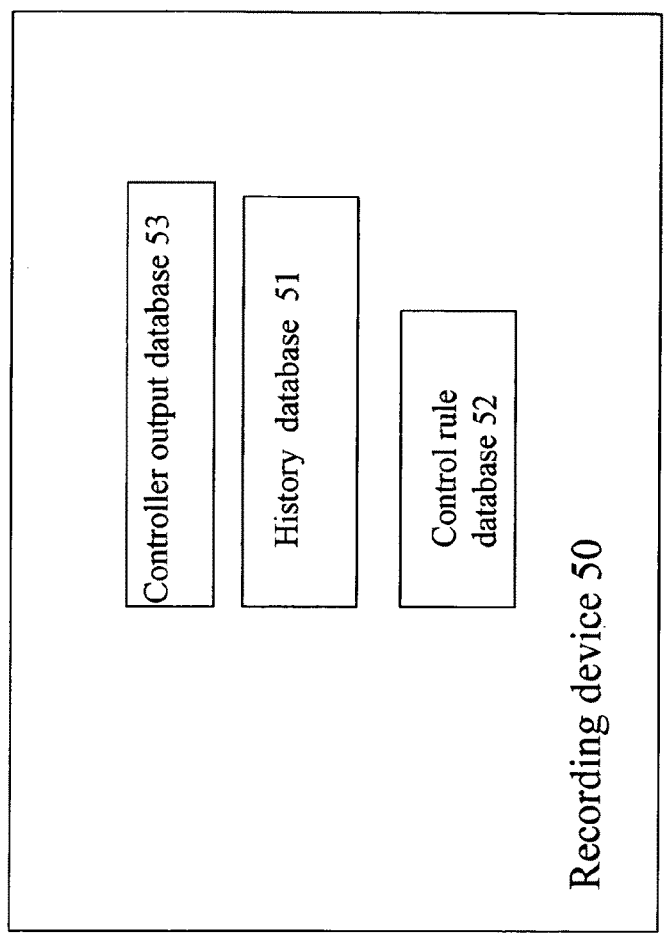
FIG. 5 shows the details of the recording unit of the present invention.

A recording unit 50 is connected to the main controller 2 for providing recording data to the main controller 2. As illustrated in FIG. 5, the recording unit 50 has a history database 51 which stores related history data by which the system manager could understand the system and the history data also assists to the control of the system. A control rule database 52 included in the recording unit 50 stores all rules for the main controller 2 by that the main controller 2 can control the system based on the rule in the control rule database 52. A controller output database 53 included in the recording unit 50 stores output data of the main controller 2.

Each street lamp 20 further includes the following elements.

A light source 21 is installed at an upper end of the street lamp 20. The light source 21 may be a HGD (high pressure gas discharge lamp) or HID (high intensity discharge lamp) or an LED (light emitting diode) lamp.

A lamp rod 22 is installed below the light source 21.

A battery set 4 includes at least one battery (or cell) and is arranged at a middle section of the lamp rod 22. If the battery set 4 has a plurality of cells, the cells are arranged serially along the longitudinal direction of the lamp rod 22. The design of the battery set 4 serves for space-saving and hiding. In the present invention, the amount of charges of each battery must be measured for being used by the controller in the controlling stage. There are many known ways which can get the amount of charges of a battery, for example, by building a table listing the relation about the amount of charges and the voltages. Thus by measuring the voltage of the battery, we can get the amount of charges.

At least one solar plate 1 (a plate for absorbing solar energy and converting the energy into electric energy for further use) is generally installed at an upper side of the light source 21 for absorbing solar energy. The absorbed solar energy is firstly converted into electric energy. The electric energy can be directly transferred to the light source 21 for lighting up. Or the electric energy is stored in the battery set 4 for using as needed.

Each of the input and output end of the battery set 4 has a relay 3 and relay 3', respectively for controlling the power flow of the solar plate 1.

A DC-AC ballast 6 is installed between the battery set 4 and the light source 21 for actuating the light source 21 and providing stable power supply so that the light source 21 has stable power for lighting up.

Referring to FIG. 3, the second embodiment of the present invention is illustrated. It is illustrated that two street lamps 20 are used in the present invention. In this embodiment, those identical to the above embodiment will not be further described herein. Only those different from above embodiment are described. In FIG. 3, it is shown that in the case of two street lamps 20 are used. Each street lamp 20 has the same elements as the embodiment illustrated in FIG. 2, while only one main controller 2 is used for both the two street lamps 20. However this is also suitable for the case that a plurality of street lamps 20 are used. Likewise, only a main controller 2 is needed. In this, the present invention the two batteries can be electrically connected so that one battery can support other battery if the battery charges are insufficient.

The main feature of the present invention is that all the power of the street lamps 20 can be managed by the system of the present invention. Namely the voltage of each street lamp 20 is controlled through the main controller 2 so as to improve the efficiency of the street lamp 20 and the safety of all the street lamps 20.

In the following, we will discuss the control modes of the present invention which is performed through the main controller 2.

The first control mode performed by the main controller 2 of the present invention is that the main controller 2 calculates the amount of charges of the battery sets 4 (for example, by measuring the output voltage of the battery and thus contrast with a table) for all the street lamps so as to determine the illuminations of all street lamps 20. If the powers of all battery sets 4 are not sufficient to light up all the light sources 21, the main controller 2 sets that only some of the light sources 21 light up, while other light sources 21 are not actuated.

The second control mode provided by the main controller 2 is that the main controller 2 calculates the powers of all battery sets 4 for determining the illuminations of all light sources 21. If the powers of all battery sets 4 are not sufficient to light up all the light sources 21, the main controller 2 sets that only some selected light sources light up with a predetermined illumination (not fully light up). It may be that all the light sources 21 light up with insufficient illumination. Namely, in this control mode, the voltage of each light source 21 is controlled to have a predetermined illumination.

In the third control mode according to the present invention, a voltage level of a DC-AC ballast 6 (direct current to alternative current ballast) is controlled so as to adjust the illumination of the light source 21. The present invention uses such mechanism to control the power output of the battery set 4. When the sum of powers of all the battery sets 4 are not sufficient to make all the light sources 21 to light up, this way can control the illumination of the respective light source 21 so as to have the object of illuminating a section of a load with a plurality of street lamps. In this way, DC to AC converter is unnecessary so as to save the power cost.

Another control mode of the present invention is a time control mode. The main controller 2 controls the light up time period of each light source 21 based on the power status.

Above four methods can be combined as desired so as to achieve the required efficiency.

The main controller 2 of the present invention has the function of capturing information about the power, current and voltage of each solar plate, actuating and de-actuating the relays, acquiring the charge amount and voltage of each battery set, controlling the voltage of each DC-AC ballast, illumination control of each light source, and acquiring the status of each light source 21.

Figure 4:
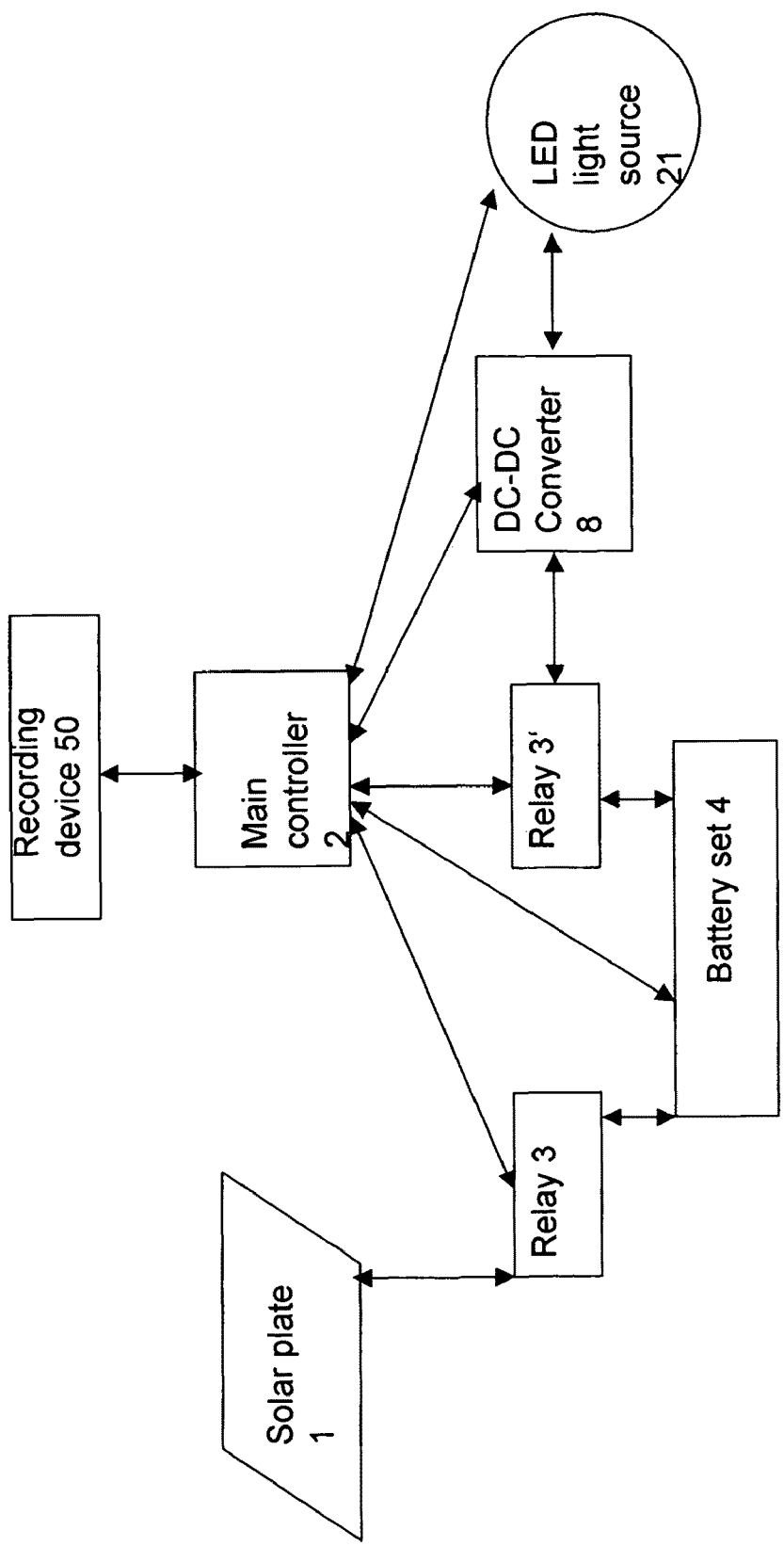
FIG. 4 is a structural block diagram of the present invention, in that LED is used as a light source.

Referring to FIG. 4, it is illustrated that the present invention can be used to LED (light emitting diode) light sources 23. In this embodiment, those identical to the above embodiment will not be further described herein. Only those differences from above embodiment are described. In this the present invention, LED is used as a light source, and a DC-DC converter 7 is added between the light source 23 and a relay for down-converting high voltage current from the solar plate 1 or battery set 4 into low voltage current to be provided to the LED. The operation of the main controller 2 is also suitable to this the present invention.

Figure 6:
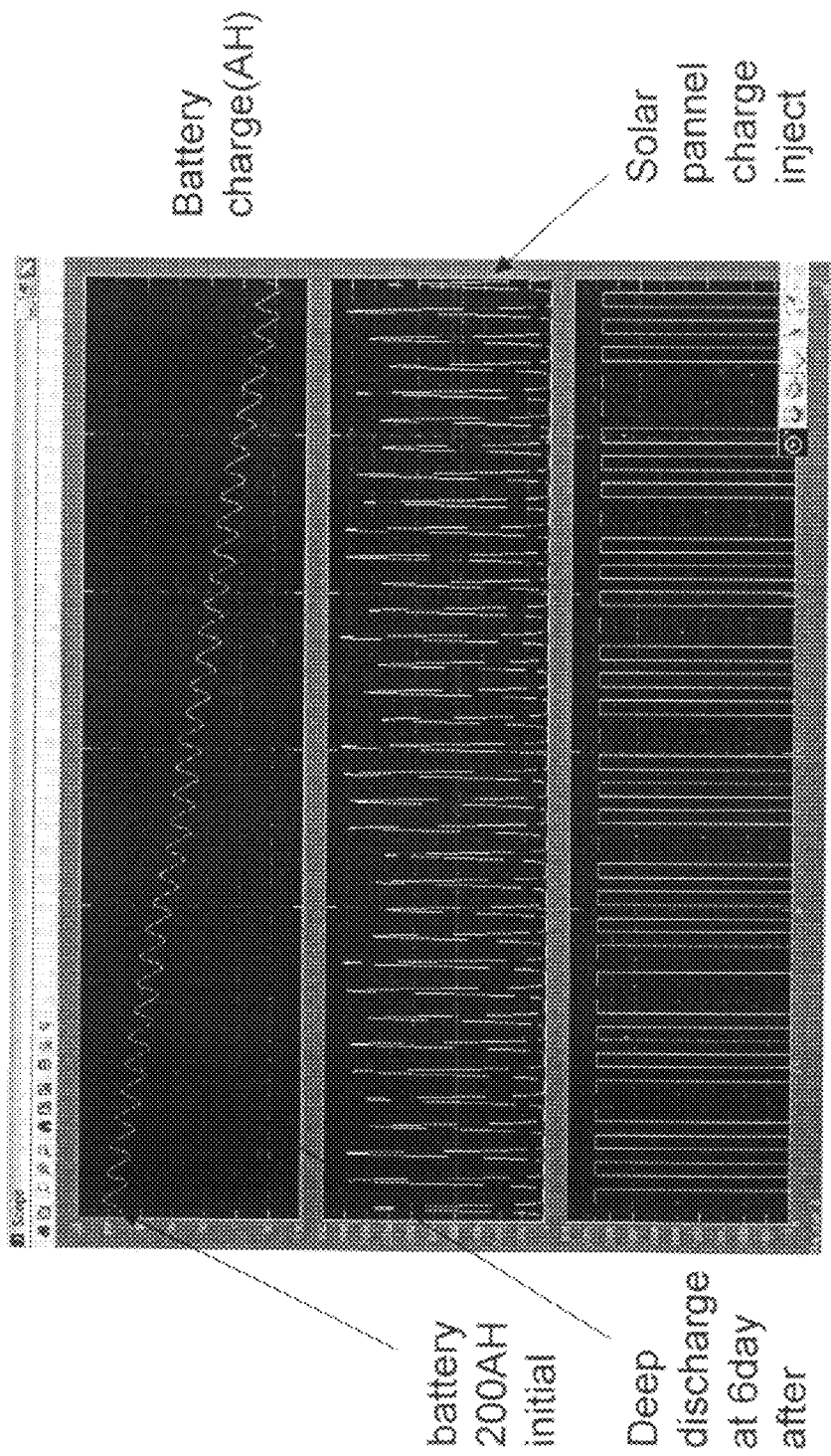
FIG. 6 shows an experiment result about the variations of voltages with the power storage of a battery, in that the prior art operation mode is used.

The effect of the present invention will be described herein. Referring to FIG. 5, it is illustrated that if no power management according to the present invention is the present invention. Referring to FIG. 5, within a period of 34 days, each day the street lamp 20 lights up with a time period of 12 hours, the voltage of the battery decays day by day and thus the quality of the battery is deteriorated. Thus the lifetime of the battery set is shortened. Referring to FIG. 6, it is illustrated that if the system of the street lamps 20 is used with the present invention, it is illustrated that in ¾ of a day, the street lamp 20 lights up with a lower illumination, the voltage of the battery set 4 is varied within a range. Furthermore, in the present invention, the battery set 4 is controlled not to be charged fully or exhaust completely to cause no power stored therein. Thus the lifetime of the battery set 4 is prolonged.

FIG. 7 shows an experiment result about the variations or voltages with the power storage of a battery, in that the operation mode of the present invention is used.

The present invention can be used in a very long load with a plurality of street lamps 20 are installed thereon. All the street lamps 20 can be divided into several sets. Each set is arranged with a main controller 2. A central control room serves to control all these main controllers 2.

Advantages of the present invention will be described herein. In the present invention, the powers of all the street lamps are calculated. Furthermore, the illumination of each street lamp is controlled based on the set control mode adapted. It may be some of the light sources light up, while others are not actuated. Or some or all light sources light up with a predetermined illumination (not light up with full illumination) so as to prolong the light time of the street lamp. The present invention will prolong the lifetime of the street lamp. Generally, if a battery is full charged or completely exhausts (not power stored in the battery) for a long time, the lifetime of the battery will shorten. The present invention calculates the amount of charge of the battery to determine the power output of the battery. If the amount of charges of the battery is too low, the power output will be reduced, while if the amount of charges of the battery is near full charged, the power output will increase so as to shorten the time period of no-power or full-power of the battery to achieve the object of prolong the lifetime of the battery. As a result, the lifetime of the solar street lamp is also prolonged.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An auto-controlling power saving system for solar energy street lamps, comprising:

at least one street lamp; each street lamp having a light source at an upper end thereof, a battery set, at least one solar plate installed at an upper end of the light source for absorbing solar energy; absorbed solar energy being converted into electric power which is transferred to the light source for lighting up the light source or is stored in the battery set; and a main controller for controlling all electric powers of the elements of the system for power management; the main controller controlling actuation, de-actuation and illumination of all street lamps; the main controller being connected to the battery sots of the street lamps and the related elements used; the main controller having a plurality of power control modes for power management and illumination control of the at least one street lamp; and wherein when the number or the at least one street lamp is greater than two, the main controller calculates power of all the battery sets for all the street lamps so as to determine the illuminations of all street lamps; if the amount of charges of all battery sets are not sufficient to light up all the light sources, the main controller sets only some selected light sources light up with a predetermined illumination, namely, not fully light up.

2. The auto-controlling power saving system for solar energy street lamps as claimed in claim 1, wherein a voltage level of a DC-AC ballast connected to the light source is controlled so as to adjust the illumination of the light source.

3. The auto-controlling power saving system for solar energy street lamps as claimed in claim 1, wherein the main controller controls a light up time period of each light source based on power status of the battery sets.

4. The auto-controlling power saving system for solar energy street lamps as claimed in claim 1, wherein the battery set is arranged at a middle section of a lamp rod and has a plurality of cells, the cells are arranged serially along a longitudinal direction of the lamp rod.

5. The auto-controlling power saving system for solar energy street lamps as claimed in claim 1, wherein each of an input end and an output end of each battery set has a relay for controlling power flow from the solar plate.

6. The auto-controlling power saving system for solar energy street lamps as claimed in claim 1, wherein each light source is a HGD light source or a IIID light source.

7. The auto-controlling power saving system for solar energy street lamps as claimed in claim 1, wherein each light source further comprises:
a DC-AC ballast installed between the battery set and the light source for actuating the light source and providing stable power supply so that the light source has stable power for lighting up.

8. The auto-controlling power saving system for solar energy street lamps as claimed in claim 1, wherein the light source is an LED lamp, and an input end of the LED lamp is connected with a DC to DC converter for converting DC current from the solar plate or the battery set into DC current with lower voltage.

9. The auto-controlling power saving system for solar energy street lamps as claimed in claim 1, further comprising: a recording unit connected to the main controller for providing recording data to the main controller.

10. The auto-controlling power saving system for solar energy street lamps as claimed in claim 9, wherein the recording unit has a history database which stores related history data by which a system manager could understand the system and the history data also assists the control of the system.

11. The auto-controlling power saving system for solar energy street lamps as claimed in claim 9, wherein the recording unit has a control rule database storing all rules for the main controller by that the main controller controls the system based on the rule in the control rule database.

12. The auto-controlling power saving system for solar energy street lamps as claimed in claim 9, wherein the recording unit has a controller output database storing output data of the main controller.

13. An auto-controlling power saving system for solar energy street lamps, comprising:
at least one street lamp; each street lamp having a light source at an upper end thereof, a battery set, at least one solar plate installed at an upper end of the light source for absorbing solar energy; absorbed solar energy being converted into electric power which is transferred to the light source for lighting up the light source or is stored in the battery set; and
a main controller for controlling all electric powers of the elements of the system for power management; the main controller controlling actuation, de-actuation and illumination of all street lamps; the main controller being connected to the battery sets of the street lamps and the related elements used; the main controller having a plurality of power control modes for power management and illumination control of the at least one street lamp; and
wherein when the number of the at least one street lamp is greater than two, the main controller calculates amount of charges of all the battery sets for all the street lamps so as to determine the illuminations of all street lamps; if the amount of charges of all battery sets are not sufficient to light up all the light sources, the main controller sets only some of the light sources light up, while other light sources are not actuated.

\* \* \* \* \*